United States Patent [19]

Marcellus

[11] 4,160,458

[45] Jul. 10, 1979

[54] AWNING CONTROL APPARATUS

[76] Inventor: Donald O. Marcellus, 1505 E. Grand, Haysville, Kans. 67060

[21] Appl. No.: 859,025

[22] Filed: Dec. 9, 1977

[51] Int. Cl.² .......................................... E04F 10/06
[52] U.S. Cl. .................................. 135/5 AT; 160/67; 160/310; 296/160
[58] Field of Search ............... 296/23 R, 23 C, 23 G; 135/5 A, 5 AT; 160/67, 68, 83 L, 310, 5; 318/285

[56] References Cited

U.S. PATENT DOCUMENTS

| 559,964 | 5/1896 | Bierstadt | 296/23 G X |
|---|---|---|---|
| 2,107,608 | 2/1938 | Hewlett | 135/5 AT |
| 2,572,077 | 10/1951 | Troutman | 160/83 L |
| 3,292,971 | 12/1966 | Zucker | 160/68 X |
| 3,294,151 | 12/1966 | Hartley et al. | 318/285 X |
| 3,324,869 | 6/1967 | Duda | 135/5 AT |
| 3,779,302 | 12/1973 | Akers | 135/5 AT |
| 3,789,903 | 2/1974 | Clark | 135/5 AT |
| 3,847,171 | 11/1974 | Akers | 135/5 AT |
| 3,918,510 | 11/1975 | Hayward | 135/5 AT |

*Primary Examiner*—Joseph F. Peters, Jr.
*Assistant Examiner*—Donn McGiehan
*Attorney, Agent, or Firm*—Edwin H. Crabtree

[57] ABSTRACT

An awning control apparatus for connecting to the side of a support structure. The apparatus having electric motors for electrically extending an awning outwardly from the side of the support structure. One side of the awning may be lowered for draining rain water from the top of the awning, and the awning may be retracted by reversing the electric motors. The apparatus may be used on recreational vehicles, campers, trailers, mobile homes, or the like.

13 Claims, 8 Drawing Figures

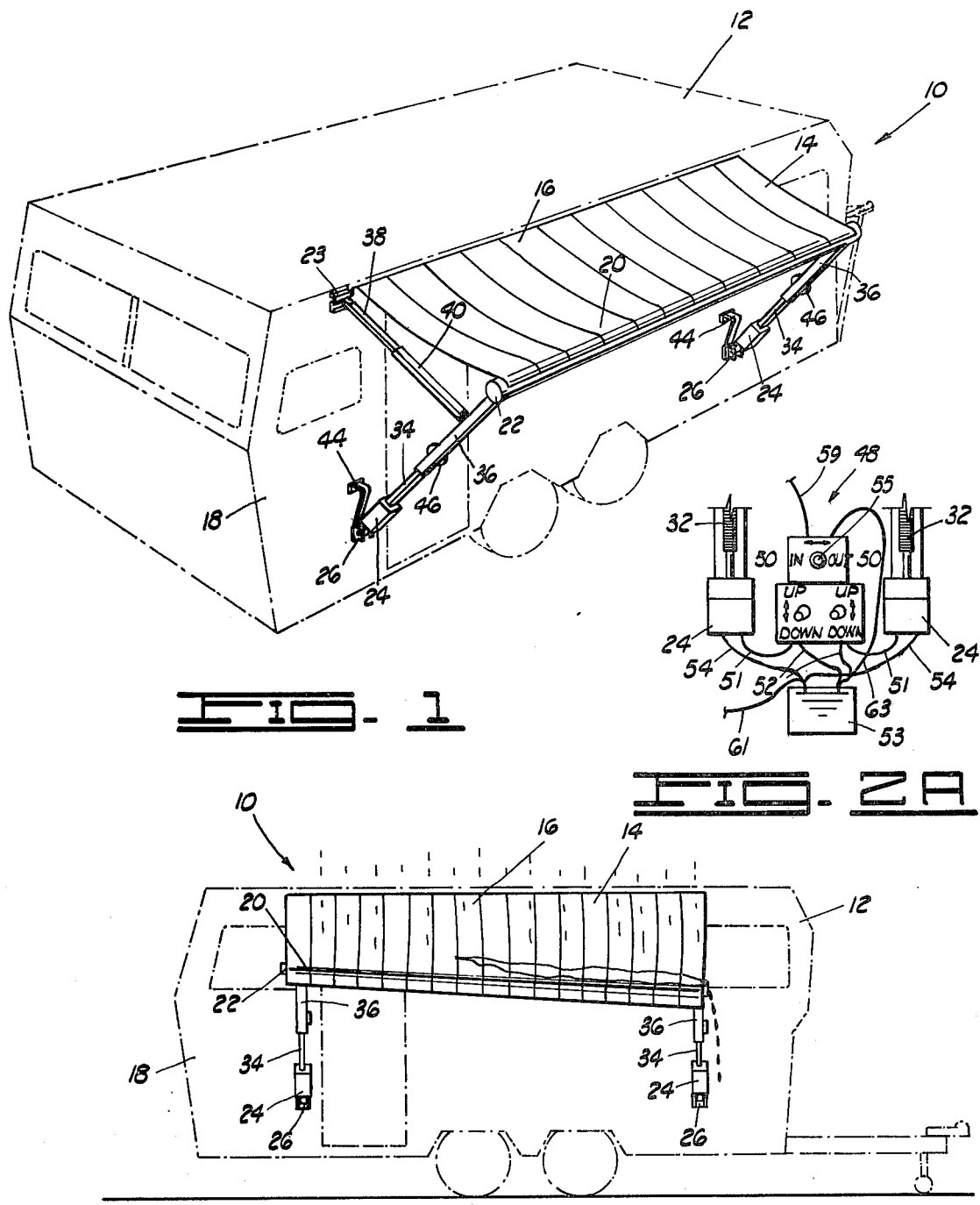

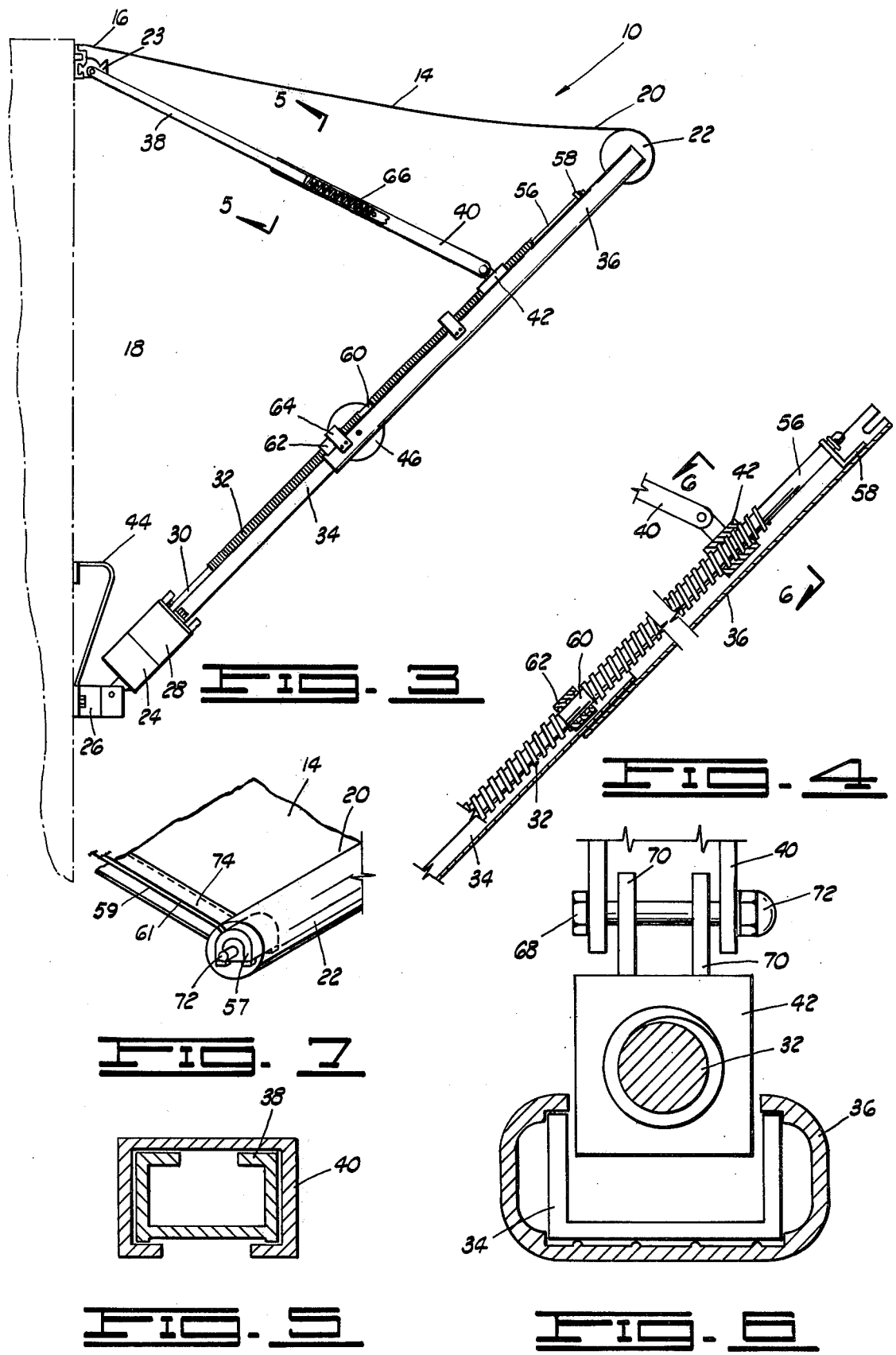

AWNING CONTROL APPARATUS

BACKGROUND OF THE INVENTION

The subject invention relates generally to awnings and more particularly but not by way limitation to an improved awning control apparatus for electrically controlling the extension and retraction of an awning from the side of a support structure.

Heretofore, awnings mounted on a roll bar and attached to the sides of recreational vehicles, mobile homes, campers, or the like have been extended outwardly and held in place by a pair of support arms attached at one end to the roll bar with the other ends mounted on the sides of the support structure. The support arms have been held outwardly by brace arms which have been held in place by manual lock devices. These types of awning apparatus have provided no means for lowering one end of the awning to remove rain water so that the awning would not collapse due to the weight of the water collected during a heavy rainstorm. Also, these awnings are raised and lowered manually and no means have been provided for electrically extending and retracting the support arms and the brace arms of the awning apparatus.

There are various types of mechanical awning assemblies for recreational vehicles such as shown in U.S. Pat. No. 3,789,903 to Clark et al, U.S. Pat. No. 3,847,171 to Akers et al, U.S. Pat. No. 3,918,510 to Hayward and U.S. Pat. No. 3,918,511 to Upton. Also there are electrical operated awnings shown in U.S. Pat. No. 3,294,151 to Hartley et al and a hand-driven winch for operating an awning control apparatus in U.S. Pat. No. 3,779,302 to Akers et al. None of these prior awning apparatus disclose the structure and advantages of the subject invention as described herein.

SUMMARY OF THE INVENTION

The subject invention provides an electrically controlled awning which may be extended and retracted without leaving an enclosed structure such as a recreational vehicle, mobile home, or the like during inclement weather.

The awning control apparatus may be lowered at one end so that rain water may be drained during heavy rainstorms to prevent the collapse of the awning due to excessive weight on top of the awning.

The invention eliminates manually raising and lowering support arms which hold a roll bar containing the awning rolled therein. Also, the apparatus eliminates the need of manually locking the support arms and roll bar in place with brace arms.

The apparatus provides means for quickly raising and lowering the awning. The awning apparatus is simple in design, rugged in construction, and may be adapted for use on different types of support structures such as recreational vehicles, campers, trailers, mobile homes, homes, office buildings, or any similar type of structure.

The apparatus includes an awning having a support end and a roll end. The support end is attached to the support structure. The roll end is mounted on a roll bar. The roll bar is spring loaded for rolling the awning thereon when retracting the awning against the side of the support structure. A pair of electric motors are pivotally attached to the support structure and are disposed below the opposite sides of the support end of the awning. A pair of elongated screw shafts are geared to the motors and extend outwardly therefrom. The shafts are rotated by the motors. A pair of lower support arms are attached to the motors. A pair of upper support arms are slidably mounted on the lower support arms and are attached to the roll bar. A pair of support arm nuts are attached to the upper support arms and threadably mounted to the screw shafts. When the screw shafts are activated, the upper support arms are fed outwardly from the lower support arms extending the awning outwardly from the roll bar as the roll bar is extended away from the support structure. A pair of upper brace arms are pivotally attached to the support structure. A pair of lower brace arms are slidably mounted on the upper brace arms and are attached to brace arm nuts. The brace arm nuts are threadably mounted on the screw shafts for feeding the lower brace arm outwardly from the upper brace arm for holding the apparatus rigidly in place when the awning is in use in an extended position outwardly from the support structure.

The advantages and objects of the invention will become evident from the following detailed description when read in conjunction with the accompanied drawings which illustrate the preferred embodiments of the invention.

BRIEF DESCRIPTION OF THE DRAWINGS

FIG. 1 is a perspective view of the awning control apparatus mounted on a mobile home.

FIG. 2 is a side view of the awning with one end of the awning lowered for draining rain water from the top of the awning.

FIG. 2A is a front view of the control switch for operating the apparatus.

FIG. 3 is a side view of the awning control apparatus.

FIG. 4 is an enlarged, sectional view of the upper and lower support arms and screw shaft.

FIG. 5 is a sectional view of the brace arms taken along Line 5—5 shown in FIG. 3.

FIG. 6 is a sectional view of the support arms and screw shaft taken along Line 6—6 shown in FIG. 4.

FIG. 7 is a partial perspective view of the awning roll bar and a motor for rolling the awning on the roll bar.

DETAILED DESCRIPTION OF THE DRAWINGS

In FIG. 1 the awning control apparatus is designated by general reference numeral 10. In this figure the apparatus 10 can be seen mounted on the side of a mobile home 12. It should be appreciated while the mobile home 12 is shown the apparatus 10 may be mounted on any type of support structure where an awning is required. By this the support structure may be the side of a recreational vehicle, trailer, residential home, office building, or the like.

The apparatus 10 includes an awning 14 having a support end 16 secured to the top of a side 18 of the mobile home 12. The side 18 provides a support structure for the apparatus 10. A roll end 20 of the awning 14 is mounted inside a roll bar 22. The roll bar 22 is a standard awning housing having a spring-loaded bar in the housing for rolling the awning 14 thereon. The awning 14 is spring-loaded in the roll bar 22 so that when the awning 14 is retracted against the side 18, the awning 14 is rolled up inside the roll bar 22. The roll bar 22 is rigidly held in place against the side 18 by upper mounting brackets 23.

In FIG. 1 the awning 14 is shown in a fully extended position for providing shade for the mobile home 12 and protecting the side 18 of the mobile home 12 from rain.

The awning 14 is extended by a pair of electric motors 24 pivotally mounted on lower mounting brackets 26 attached to the side 18. The motors 24 are geared through a gear box 28 to a threadless lower end 30 of a screw shaft 32. The gear box 28 and screw shaft 32 are shown in FIG. 3. The motor 24 and gear box 28 are attached to a lower support arm 34 which is slidably mounted in an upper support arm 36. The upper support arm 36 is attached to the roll bar 22. The roll bar 22 and upper support arms 36 are held outwardly in an extended position by a pair of upper brace arms 38 attached to the upper mounting bracket 23 and a pair of lower brace arms 40 which are slidably mounted on the upper brace arms 38 and are attached to the screw shaft 32 by a brace arm nut 42 shown in FIG. 3.

Mounted on the side 18 and adjacent the electric motors 24 are a pair of cam arms 44. A pair of cam wheels 46 are rotatably attached to the lower end of the upper brace arms 36. The wheels 46 ride on the cam arms 44 to urge the electric motors 24 and support arms 34 and 36 outwardly when it is desired to extend the awning 14 from the side 18.

In FIG. 2 a side view of the apparatus 10 is illustrated wherein one of the electric motors 24 has been activated and support arms 34 and 36 have been partially retracted to lower one end of the row bar 22 and awning 14 so that rain water may drip off the side of the awning 14 to prevent the collapse of the awning 14 due to excessive weight of the water thereon.

In FIG. 2A a toggle switch 48 is illustrated which is used for operating the apparatus 10. The switch 48 may be mounted in the mobile home 12, on the side 18, or any other convenient place. The toggle switch 48 includes outwardly extending switch levers 50 which are wired to the electric motors 24 by leads 51. The levers 50 are also connected to a battery 53 by leads 52. The battery 53 is wired to the electric motors 24 by leads 54. By moving the levers 50 in an "up" position, the apparatus 10 is extended outwardly from the side 18. By pushing the levers 50 down, the apparatus 10 is retracted.

The switch 48 also includes a lever 55 which is wired to a roll bar electric motor 57 by lead 59. The motor 57 is connected to the battery 53 by a lead 61. The lever 55 is connected to the battery 53 by lead 63. The motor 57 is shown in FIG. 7. The lever 55 operates the motor 57 for rolling the awning 14 in and out on the roll bar 22.

In FIG. 3 a side view of the apparatus 10 is illustrated showing the screw shaft 32, the support arms 34 and 36 in greater detail. The screw shaft 32 includes the threadless lower end 30 which is driven by the gear box 28 and a threadless upper end 56 which is attached to a slider bracket 58 which holds the shaft 32 in place on the upper support arm 36 as the support arm 36 is extended outwardly from the lower support arm 34. The shaft 32 also includes a threadless gap 60 spaced along the length of the shaft 32. The upper support arm 36 is extended by the screw shaft 32 by a support arm nut 62 which is attached to the lower end of the upper support arm 36 by a mounting strap 64.

Also shown in FIG. 3 is a cut-away portion of the lower brace arm 40 which includes a coil spring 66 held in compression against the lower end of the upper brace arm 38. As the apparatus 10 is extended outwardly from the side 18, the coil spring 66 urges the lower brace arm 40 outwardly away from the upper brace arm 38.

In FIG. 4 a side sectional view of the lower support arm 34 and upper support arm 36 is shown. In this view, the support arm nut 62 is shown riding freely in the threadless gap 60. The threadless gap 60 provides the safety feature of preventing the upper support arm 36 from continuing to travel outwardly on the screw shaft 32 which could cause the tearing of the awning 14. The length of the brace arm nut 42 is larger than the length of the threadless gap 60 so that as the brace arm nut 42 is threaded outwardly on the shaft 32 it rides over and across the threadless gap 60 and continues along the length of the shaft screw 32 until it reaches the threadless upper end portion 56 where it discontinues travel. At this point, the lower bracket arm 40 is in its fully extended position from the upper bracket arm 38 and the awning 14 is held tightly between the roll bar 22 and the side 18.

In FIG. 5 a cross-section taken along Line 5—5 in FIG. 3 of the upper bracket arm 38 is shown slidably received in the lower bracket arm 40. It should be noted that both the upper bracket arm 38 and lower bracket arm 40 are formed in a U-shaped channel construction.

In FIG. 6 a cross-sectional view taken along Line 6—6 shown in FIG. 4 is illustrated. In this view, the U-shaped channel construction of the lower support arm 34 can be seen riding in the U-shaped channel construction of the upper support arm 36. Also seen is a cross-section of the screw shaft 32 received through the brace arm nut 42. The brace arm nut 42 is attached to the lower end of the lower bracket arm 40 by a bolt 68 received through a pair of flanges 70 attached to the nut 42. The bolt 68 is secured to a bolt nut 72.

In FIG. 7 the electric motor 57 is shown mounted in one end of the roll bar 22. A drive shaft 72 of the motor 57 is rigidly secured to the upper end of one of the upper brace arms 36. Therefore, when the lever 55 is activated, the motor 57 is rotated inside the roll bar 22 rolling the awning 14 in or out thereon. It has been found that the awning 14 in the roll bar 22 is prevented from unrolling and often binds when the lower bracket arm 40 is initially screwed outwardly from the upper bracket arm 38. The motor 57 by unrolling the awning 14 prevents this binding and allows the awning 14 to be easily rolled and unrolled on the roll bar 22. The leads 59 and 61 to the motor 57 are disposed inside a seam 74 of the awning 14.

In operation of the apparatus 10 is disposed against the side 18 of the trailer 12 with the roll bar 22 held in place by the upper mounting brackets 23. When it is desired to extend the awning 14 outwardly from the side 18, the motors 24 are activated by raising the levers 50 of the toggle switch 48 in an "up" position. The motors 24 are then activated turning the screw shaft 32 thereby threading the support arm nut 62 and bracket arm nut 42 outwardly on the screw shaft 32. The support arm nut 62 being attached to the upper support arm 36 extends the upper support arm 36 outwardly from the lower support arm 34. At the same time, the bracket arm nut 42 urges the lower bracket arm 40 outwardly from the upper bracket arm 38. The spring 66 held in compression between the lower bracket arm 40 and upper bracket arm 38 aids in further urging the lower bracket arm 40 outwardly from the upper bracket arm 38.

The cam wheel 46 also begins to ride upwardly on the cam arm 44 thereby urging the upper support arm 36 outwardly away from the side 18. When the cam wheel 46 reaches the top of the cam arm 44, the apparatus 10 has been urged sufficiently outward and away from the side 18 so that the upper support arm 36 is now being raised both upwardly and outwardly away from the mobile home 12. The upper support arm 36 is extended on the screw shaft 32 until the nut 62 is threaded into the threadless gap 60 where it discontinues travel and rides freely thereon as the screw shaft 32 continues to feed the bracket arm nut 42 which has riden past the threadless gap 74. The nut 42 continues to extend the lower bracket arm 40 outwardly away from the upward bracket arm 38 until the bracket nut 42 is threaded onto the threadless upper end portions 56 of the screw shaft 32 where it discontinues travel. At this point, the awning 14 has been completely extended from the roll bar 22.

When it is desired to retract the awning 14, the levers 50 on the toggle switch 48 are held in a "down" position thereby reversing the motors 24 which in turn reverse the direction of the screw shafts 32 and begin threading the support arm nut 62 and bracket arm nut 42 in an opposite direction downwardly toward the threadless end portion 30 of the screw shaft 32. As the upper support arm 36 is retracted on the lower support arm 34 and the lower bracket arm 40 is retracted on the upper bracket 38, the roll bar 22 automatically rolls the awning 14 thereon until the awning 14 is completely rolled on the roll bar 22 and the roll bar 22 is again locked on the upper mounting brackets 24.

Changes may be made in the construction and arrangement of the parts or elements of the embodiment as disclosed herein without departing from the spirit or scope of the invention as defined in the following claims.

I claim:

1. An awning control apparatus for connecting to a support structure, the apparatus comprising:
   an awning having a support end and a roll end, the support end attached to the support structure;
   drive means attached to the support structure;
   an elongated drive shaft attached to said drive means and rotated thereby;
   a telescoping support arm attached to said drive shaft and the roll end of said awning, said drive shaft extending said support arm and said awning outwardly from the support structure; and
   a telescoping brace arm attached to said drive shaft and the support structure, said drive shaft extending said brace arm outwardly from the support structure.

2. The apparatus as described in claim 1 wherein said drive means is an electric motor pivotally attached to the support structure and geared to said drive shaft.

3. The apparatus as described in claim 1 wherein said drive shaft is an elongated threaded screw shaft.

4. The apparatus as described in claim 1 wherein said telescoping support arm includes a lower support arm having a lower end and an upper end, the lower end of said lower support arm attached to said drive means and an upper support arm having a lower end and an upper end, the upper end of said upper support arm attached to the roll end of said awning, said upper support arm slidably mounted in said lower support arm.

5. The apparatus as described in claim 4 wherein said upper support arm is attached to said drive shaft by a support arm nut threadably mounted on said drive shaft.

6. The apparatus as described in claim 1 wherein said telescoping brace arm includes a lower brace arm having a lower end and an upper end, the lower end of said lower brace arm attached to said drive shaft and an upper brace arm having a lower end and an upper end, the upper end of said upper brace arm pivotally attached to the support structure, said upper brace arm slidably mounted on said lower brace arm.

7. The apparatus as described in claim 6 wherein said lower brace arm is attached to said drive shaft by a brace arm nut threadably mounted on said drive shaft.

8. An awning control apparatus for connecting to a support structure, the apparatus comprising:
   an awning having a support end and a roll end, the support end attached to the support structure, the roll end mounted on a roll bar;
   a pair of electric motors pivotally attached to the support structure, said motors disposed below the opposite sides of the support end of said awning;
   a pair of elongated screw shafts geared to said motors and extending outwardly therefrom, said shafts rotated by said motors when said motors are activated;
   a pair of lower support arms having a lower end and an upper end, the lower end attached to said motors;
   a pair of upper support arms having a lower end and an upper end, the upper end attached to said roll bar, said upper support arms slidably mounted on said bottom support arms;
   a pair of support arm nuts attached to the lower end of said upper support arms and threadably mounted on said screw shafts for feeding said upper support arms upwardly from said lower support arms;
   a pair of upper brace arms having a lower end and an upper end, the upper end pivotally attached to the support structure and disposed above said motors;
   a pair of lower brace arms having a lower end and an upper end, said lower brace arms slidably mounted on said upper brace arms; and
   a pair of brace arm nuts attached to the lower end of said lower brace arms, said brace arm nuts threadably mounted on said screw shafts for feeding said lower brace arm outwardly from said upper brace arm.

9. The apparatus as described in claim 8 wherein said screw shafts have a threadless gap along the length of said shafts wherein the threads of said shafts are removed, the length of said gap greater than the length of said support arm nuts but less than the length of said brace arm nuts so that said brace arm nuts when threaded on said screw shafts may be threaded over and past said gap but said support arm nuts ride freely in said gap.

10. The apparatus as described in claim 9 wherein said screw shafts have a threadless lower end and a threadless upper end.

11. The apparatus as described in claim 8 wherein said lower brace arms include a coil spring disposed therein and biased against the lower end of said upper brace arms and held in compression there between, said springs biasing said lower brace arms outwardly from said upper brace arms.

12. The apparatus as described in claim 8 further including a pair of cam arms mounted on the support structure and adjacent said electric motors and a pair of cam wheels attached to the lower ends of said upper support arms, said cam wheels contacting said cam arms when said upper support arms are extended outwardly from lower support arms, said cam wheels when riding on said cam arms urging the apparatus outwardly from the support structure.

13. The apparatus as described in claim 8 further including a roll bar electric motor mounted in one end of the roll bar, the drive shaft of said motor rigidly secured to the upper end of one of said upper support arms, said roll bar electric motor when activated rolling said awning thereon.

* * * * *